United States Patent Office

Re. 26,792
Reissued Feb. 17, 1970

26,792
DI(BETA ETHYLSULFONYL) SALTS

Giuliana C. Tesoro, Dobbs Ferry, N.Y., assignor to J. P. Stevens & Co., Inc., New York, N.Y., a corporation of Delaware No Drawing. Original No. 3,201,434, dated Aug. 17, 1965, Ser. No. 71,428, Nov. 25, 1960. Application for reissue Mar. 28, 1968, Ser. No. 753,800

Int. Cl. C07c *141/02, 149/10;* C07d *33/38*

U.S. Cl. 260—453 4 Claims

Matter enclosed in heavy brackets [ ] appears in the original patent but forms no part of this reissue specification; matter printed in italics indicates the additions made by reissue.

The present invention relates to new and valuable organic sulfur compounds and to methods of preparing them. More specifically the invention provides new reactive compounds which are useful reagents for crosslinking polymeric molecules generally and for the chemical modification of fibrous polymers in particular.

The compounds of the present invention can be represented by the general Formula I (I) $Q(ACH_2CH_2Z)_y$ where Q represents an organic radical having a molecular weight of less than 250; y is equal to the number of unsatisfied valences and has a value of more than one, A is a sulfur containing radical, and Z represents a polar residue derived from a reagent of weak nucleophilic character. More specifically, Q is selected from the group consisting of substituted and unsubstituted aliphatic, aromatic and alkylaromatic radicals containing at least 2 carbon atoms, Z is selected from the group consisting of the cation of a weak base (ionization constant $<10^{-5}$) and the anion of a strong acid (ionization constant $>10^{-5}$), A is a sulfur containing radical selected from the group consisting of sulfide (S), sulfoxide (SO) and sulfone ($SO_2$), and y preferably has a value from 2 to 4.

Examples of Q are the following.

Aliphatic:

—$C_nH_{2n}$—, where n is greater than 1.

—$(C_nH_{2n}O)_m$—$C_nH_{2n}$—, where n is greater than 1, and m has a value of 1 or greater.

—$C_nH_{(2n-1)}$—, where n is greater than 2.

—$C_nH_{(2n-2)}$—, where n is greater than 2.

Aromatic: —$C_6H_{12-(8+a)}X_a$, where X is a halogen and a has a value from 0 to 4 such as —$C_6H_4$—, —$C_6Cl_4$—, —$C_6H_3Cl$—, and the like.

Alkyl aromatic: $C_bH_{2b}C_6H_4C_dH_{2d}$—, where b and d have a value of 1 to 4 such as —$CH_2C_6H_4CH_2$—, —$C_2H_4C_6H_4C_2H_4$—, —$C_3H_6C_6H_4C_3H_6$—, and the like.

Examples of Z when Z is the anion of a strong acid are the following:

—$OSO_3M$, sulfate residue where M is selected from the group consisting of alkali metal and ammonium.

—$SSO_3M$, thiosulfate residue where M has the same meaning as above.

—$OCOCH_3$, acetate.

Other examples of Z are generally ester forming residues derived from strong acids such as polybasic inorganic acids, and organic acids, for example, phosphoric, sulfuric, thiosulfuric formic, acetic, benzene sulfonic, toluene sulfonic, methane sulfonic and the like.

When Z is the cation of a weak base, the compounds of Formula I can be represented by a generic Formula II II) $$Q(ACH_2CH_2-\underset{X^-}{\overset{+}{N}}\equiv Y)_y$$

where A, Q and y have the same meaning as in Formula

I, and $$-\underset{X^-}{\overset{+}{N}}\equiv Y$$

is a cationogenic group containing the quaternary nitrogen atom N covalently bound to the residue Y which represents an organic terminal structure satisfying three covalences of the quaternary nitrogen atom by means of carbon nitrogen bonds, and electrostatically bound to the anion X. It is apparent from the discussion above and from Formula II, that the group $$-\underset{X}{\overset{+}{N}}\equiv Y$$

can be derived from a tertiary amine having an ionization constant lower than $10^{-5}$. The heterocyclic bases such as pyridine, picoline, lutidine, quinoline, isoquinoline and the like are particularly suitable for the preparation of the compounds shown in Formula II. Aliphatic, aromatic and alkylaromatic tertiary bases can also be used providing their dissociation constant does not exceed the value of $10^{-5}$. Representative of these compounds are dimethylaniline and benzyldimethylamine.

Although the present invention contemplates organic sulfides, sulfoxides, and sulfones, the last mentioned compounds are preferred due to their greater reactivity.

The preparation of the sulfone compounds can be carried out from the corresponding hydroxyethyl sulfones (III) $Q(SO_2CH_2CH_2OH)_y$ The compounds of Formula III which are used as starting materials for the preparation of the sulfones of the present invention are described in my copending application Serial No. 41,805, filed on July 11, 1960. The preparative steps which are required for the conversion of the hydroxyl compounds shown in Formula III to the novel derivatives shown in Formula I depend mainly on the structure of the grouping Z. Intermediate compounds, where Z is halogen, can be prepared for example from the corresponding hydroxyethyl compounds by reaction with halogenating reagents as shown for example in Equation 1, where thionyl chloride is used to convert the hydroxyl group to chloride.

(1) $$-SO_2CH_2CH_2OH+SOCl_2\rightarrow -SO_2CH_2CH_2Cl+SO_2+HCl$$

This reaction is preferably carried out at temperatures of 20° to 70° C. It can be carried out in the presence of an inert solvent or without a solvent.

Where Z is the residue of an organic acid, the compound can be prepared by direct esterification of the hydroxyl groups. However, caution must always be exercised in the selection of the reaction conditions since the presence of the sulfone grouping greatly influences the reactivity and properties of hydroxyl groups which are in a beta position with respect to the sulfone group. Where Z is a thiosulfate residue, optimum yields of the compound are obtained by first converting the hydroxyethyl sulfone compound to the haloethyl sulfone compound as shown in Equation 1, and then reacting the haloethyl sulfone compound with a neutral thiosulfate as shown in Equation 2:

(2) $$-SO_2CH_2CH_2Cl+M_2SSO_3\rightarrow -SO_2CH_2CH_2SSO_3M+MCl$$

wherein M is a metal, preferably alkali. Reaction (2) can be carried out in an aqueous solution or in the presence of other solvent in which the inorganic reactant (thiosulfate) is soluble. Temperatures between 20° C.

and 100° C. give excellent yields, with higher temperatures increasing the rate of formation of the product.

It is also possible to dehydrohalogenate the intermediate haloethyl compound to a vinyl derivative as shown in Equation 3:

$$(3)\quad -SO_2CH_2CH_2Cl + MOH \rightarrow -SO_2CH{=}CH_2 + MCl + H_2O$$

and then react the vinyl compound formed with neutral thiosulfate as shown in Equation 4:

$$(4)\quad -SO_2CH{=}CH_2 + M_2SSO_3 + H_2O \xrightarrow{H^+} -SO_2CH_2CH_2SSO_3M + MOH$$

under such conditions that the basic compound (MOH) formed as a byproduct is neutralized and the pH is maintained between about 6.0 and 8.0. The preparation of related compounds is described in further detail in applicant's copending application Serial No. 13,429, filed March 8, 1960, now U.S. Patent No. 3,153,077, and assigned to the same assignee.

The synthetic route shown in Equation 2 is preferable to that shown in Equations 3 and 4, since it yields the desired product in a single step. However, the preparation of new vinyl sulfone compounds from saturated derivatives in the presence of an alkali base can be carried out generally according to Equation 5 of which Equation 3 above is a special case $$(5)\quad -SO_2CH_2CH_2Z + MOH \rightarrow -SO_2CH{=}CH_2 + MZ + H_2O$$

Where Z is a sulfate residue, optimum yields of the compound are obtained by reacting the hydroxyethyl sulfone compound with sulfamic acid as shown in Equation 6:

$$(6)\quad -SO_2CH_2CH_2OH + HO-\overset{\overset{O}{\|}}{\underset{\underset{O}{\|}}{S}}-NH_2 \longrightarrow -SO_2CH_2CH_2OSONH_4$$

Reaction (6) must be carried out at elevated temperature, preferably between about 70° C. and 140° C. Inert organic solvents can be used as diluents. The use of catalysts such as urea and other amides increases the yield of the desired product.

The ammonium salt formed in reaction (6) can be converted to an alkali salt by reaction with an alkali carbonate or bicarbonate and removal of the ammonia which is liberated. Sulfates can also be prepared by other reactions of the hydroxyethyl or haloethyl compounds with appropriate reagents, but the use of common sulfating agents such as sulfuric acid, chlorosulfonic acid and sodium acid sulfate is not advantageous, since side reactions involving dehydration impair the yields of the desired products.

Where Z is a nitrogen containing cationic residue as shown in Formula II the preparation of the compounds can be carried out from the haloethyl compound by reaction with a tertiary amine as shown in Equation 7

$$(7)\quad -SO_2CH_2CH_2X + N{\equiv}Y \longrightarrow SO_2CH_2CH_2\overset{+}{N}{\equiv}Y \;\; (X^-)$$

where X=halogen.

This reaction can be carried out in presence or in absence of inert diluents, at temperatures between about 50° C. and about 120° C., with the rate of reaction increasing with increasing temperature.

It is also possible to prepare the compounds of Formula II from an intermediate vinyl compound (see Equation 5 above) by reaction with an amine hydrohalide as shown in Equation 8, $$(8)\quad -SO_2CH{=}CH_2 + H\overset{+}{N}{\equiv}Y \;(X^-) \longrightarrow -SO_2CH_2CH_2\overset{+}{N}{\equiv}Y \;(X^-)$$

This reaction takes place under mild conditions in most instances, but the synthesis shown in Equation 7 is generally preferable, since it eliminates the necessity for preparing and isolating the vinyl compounds in a separate step.

Other methods can be used for preparing the compounds of the invention. For example, a polymercaptan (IV) $Q(SH)_y$ can be reacted with a large excess of an ethylene dihalide, yielding a thioether (V) $Q(SCH_2CH_2X)_y$ which can be oxidized to the corresponding suloxide and sulfone compounds, (VI) $Q(SOCH_2CH_2X)_y$ and (VII) $Q(SO_2CH_2CH_2X)_y$ respectively. Also, salts of poly-sulfinic acids (VIII) $Q(SO_2M)_y$ can be used as starting materials for reaction with an ethylene dihalide. The preparation from the hydroxyethyl compounds of Formula III, however, is believed to offer significant economic and practical advantages.

It is apparent from the above discussion that hydroxyethyl sulfides and hydroxyethyl sulfoxides can also be employed in the reactions outlined whenever sulfide and sulfoxide derivatives are desired as the final products.

The physical properties of the sulfur compounds of this invention depend on the structure of the groups Q and Z. The compounds are generally crystalline solids, soluble in water and organic solvents to an extent which is dependent on their structural configuration, but always sufficient to permit the use of these compounds in organic reactions.

The new compounds of the present invention are valuable intermediates for the synthesis of monomers and polymers containing sulfide, sulfoxide and sulfone groupings. They are useful as crosslinking agents for polymers generally, and particularly for the chemical modification of fibrous polymers. Other specific uses for the compounds depend on the structure of the group Q. For example reactive dyes, textile treating agents, and surface active agents can be obtained by selecting suitable structures for Q.

Example 1

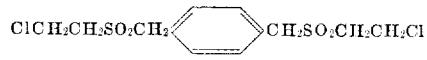

α,α′-bis(beta-chloroethylsulfonyl)para-xylene 264 grams (0.82 mol) of α,α′-bis(beta-hydroxyethylsulfonyl)para-xylene (M.P. 197–200° C.) were stirred with a mixture of 194 grams (2.46 mols) of pyridine and 150 grams of benzene in a flask equipped with an addition funnel and a reflux condenser. 293 grams (2.46 mols) of thionyl chloride were then added dropwise with vigorous mechanical stirring to the slurry which was formed. The rate of addition of the thionyl chloride was regulated so as to maintain a temperature of 20°–40° C. in the reaction mixture. The reaction was exothermic, and a thick lumpy slurry was formed. In the course of reaction, 400 g. of benzene were added in order to maintain satisfactory stirring of the mixture and to break up solid lumps. After completing addition of the thionyl chloride, the mixture was stirred at room temperature for several days in order to complete the reaction. The mixture was then added to several volumes of water, and the precipitate which was formed was filtered, washed with water and dried. The crude product was a sand colored powder, weighing 294 grams (quantitative yield) and melting at 224°–226° C. The product contained no ionic chloride. Analysis of the organically bound chloride gave 17.4% Cl. The calculated percent Cl for α,α′-bis(beta-chloroethylsulfonyl)para-xylene is 19.8%. The product obtained was thus 88% pure. The product was only slightly soluble in most organic solvents, and not easily purified by crystallization. It could be used for the preparation of more soluble derivatives without further purification.

Example 2

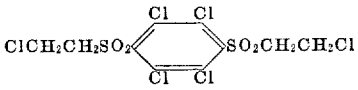

1,4-di(beta-chloroethylsulfonyl)-2,3,5,6-tetrachlorobenzene 130 grams (0.3 mol) of 1,4-di(beta-hydroxyethylsulfonyl)-2,3,5,6-tetrachlorobenzene (M.P. 200°–203°) were mixed with 71 grams (0.9 mol) of pyridine and 200 grams of benzene to form a slurry. 107 grams (0.9 mol) of thionyl chloride were added dropwise with vigorous mechanical stirring over a period of 2½ hours, while maintaining the temperature of the reaction mixture at 25°–55° by regulating the rate of addition and by the use of an ice-water cooling bath. After completing the addition of the thionyl chloride, the reaction mixture was refluxed for 2 hours. It was then added to several volumes of cold water. The precipitate was filtered, thoroughly washed with water and dried. 55 grams (40% yield) of a white crystalline powder were obtained. M.P. 182°–185° C. The product contained non ionic chloride. The hydrolyzable chlorine content (other than ring chloride) was 15.7% (calculated 15.2%), indicating excellent purity.

Example 3

$ClCH_2CH_2SO_2CH_2CH_2OCH_2CH_2SO_2CH_2CH_2Cl$ 1,2-bis(beta-chloroethylsulfonyl)ethane 151 grams of 1,2-bis(beta-hydroxyethylsulfonyl)ethane (M.P. 114°–116°, percent sulfur calculated 26.0, found 25.95%) (0.61 mol) were dissolved in 145 grams of pyridine (1.83 mols) on warming and stirring. 218 grams (1.83 mols) of thionyl chloride were then added dropwise with vigorous mechanical stirring at such a rate as to maintain the temperature of the reaction mixture at 40°–60°. After addition of the thionyl chloride was completed, the mixture was stirred for several hours, then added to several volumes of water. The tan color precipitate formed was filtered, washed with water and dried in a vacuum dessicator. The yield of solid thus obtained was 89 grams (53% of the theoretical). The product was free of ionic chloride. Analysis of bound chloride gave 22.4% Cl (calculated 26.0%). The M.P. of the crude product so obtained was 199–203° C. (reported 205–206°).

Example 4

$ClCH_2CH_2SO_2CH_2CH_2OCH_2CH_2SO_2CH_2CH_2Cl$

Di(beta-chloroethylsulfonylethyl)ether 200 grams of di(beta-hydroxyethylsulfonylethyl)ether (0.69 mol) were dissolved in 180 grams of pyridine (2.3 mols), and 250 grams (2.1 mols) of thionyl chloride were added dropwise with vigorous mechanical stirring at such a rate as to maintain the temperature at 40°–60° C. The reaction was slightly exothermic and the addition required 7 hours. After completing the addition, the mixture was heated under reflux at 80°–100° for 2 hours, then cooled to room temperature. Sufficient methylene chloride was added to give a clear solution, and the solution was washed with water until the wash water was free of dissolved salts. It was then dried over calcium chloride, filtered and stripped of solvent. The viscous residue which remained weighed 160 grams (71% yield). Analysis of the crude product for combined chloride gave a somewhat high result (calculated Cl, 21.6%; found 26.3%). The product could be purified by dissolving in acetone/ethanol stripping part of the solvent and chilling. The purified product was a crystalline solid melting at 67°–70° C. (reported 70°–71°).

Example 5

$NaO_3SSCH_2CH_2SO_2CH_2CH_2OCH_2CH_2SO_2CH_2CH_2SSO_3Na$

Bunte salt from bi(beta-chloroethylsulfonyl ethyl)ether 32.7 grams of the crude product of Example 4 (0.1 mol) were dissolved in 50 cc. of methanol, and a solution of 49.6 grams (0.2 mol) of sodium thiosulfate pentahydrate was added. The mixture was refluxed with stirring for 8 hours, or until an iodine titration indicated that 95% of the sodium thiosulfate has been consumed. The clear solution was then concentrated in vacuo, and the residue was dried to yield the desired thiosulfate compound. The product obtained (60 grams) was contaminated by the sodium chloride formed in the reaction as a byproduct. No attempt was made to remove this inert impurity, since the composition of the product could be accurately established by the following analytical procedure; argentometric titration of chloride ion for determination of sodium chloride; iodometric titration of free thiosulfate ion for determination of unreacted sodium thiosulfate; and alkaline hydrolysis of the product for determination of organically combined thiosulfate. When analyzed by these procedure, the crude Bunte salt of Example 5 gave the following results:

| | |
|---|---|
| Sodium chloride | 19.3 |
| Free thiosulfate (pentahydrate) | 2.1 |
| Bunte salt | 76.0 |

Example 6

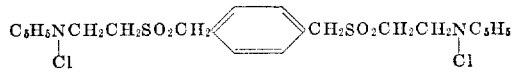

Bis(beta-pyridiniumethylsulfonyl)-p-xylene dichloride 54 grams (0.15 mol) of the product of Example 1, 26 grams (0.33 mol) of pyridine and 200 grams of dimethyl formamide were heated with stirring at 50–60° for 18 hours. The crude bis-quaternary compound was filtered and repeatedly washed with acetone. A sand colored powder was obtained, weighing 35 grams (yield 46% of the theoretical). The crude product was contaminated by small amounts of unreacted starting materials.

While the quaternary ammonium compound was soluble in water, the starting material was completely insoluble in water, and could be removed from aqueous solutions of the product by simple filtration. Analysis for ionic chloride of the filtered solution was sufficient to calculate the product concentration in solution.

Example 7

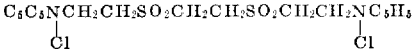

1,2-bis(beta-pyridiniumethylsulfonyl)ethane dichloride 79 grams of the product of Example 3 (86% purity, 0.25 mol pure product), 47 grams (.6 mol) of pyridine and 225 grams of acetone were refluxed for 18 hours. The solid present was filtered and dried. The yield was 97 grams (90% of the theoretical). The chloride analysis of the water soluble crystalline bis quaternary ammonium compound indicated 92% purity (calculated Cl, 16.4%; found, 15%). Analysis of the product by electrometric titration with standard sodium hydroxide gave an equivalent weight of 212 (calcd. 215).

Example 8

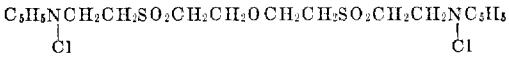

Bis(beta-pyridiniumethylsulfonyl ethyl)ether dichloride 150 grams (0.46 mol) of the crude product of Example 4 and 79 grams (1.0 mol) of pyridine were refluxed for 21 hours, with 150 grams of methanol. The mixture was stripped, and the syrupy product was washed several times with acetone by stirring, allowing to settle and decanting. By this technique, the product was induced to crystallize and obtained as a tan colored hygroscopic powder. The yield of crystalline product was 129 grams (56% of the theoretical). Chloride analysis indicated 99% purity (calculated, Cl, 14.6%; found, 14.5%). Analysis of the product by electrometric titration gave an equivalent weight of 247 (calcd. 243).

Example 9

$$H_4NO_3SOCH_2CH_2SO_2(CH_2CH_2O)_2 CH_2CH_2SO_2CH_2CH_2OSO_3NH_4$$

Ammonium salt of di(beta-sulfatoethylsulfonyl ethyl) diethoxy ethane 100 grams of the bis hydroxyethyl sulfone $$HOCH_2CH_2SO_2(CH_2CH_2O)_2CH_2CH_2SO_2CH_2CH_2OH$$

(0.3 mol), 61 grams of sulfamic acid (0.63 mol) and 10 grams of urea were heated to 120° C. with vigorous stirring. The reaction became exothermic, and the temperature was maintained for 1 hour at 120°–130° without external heating. At the end of this time the reaction mixture was cooled, and set to a homogeneous crystalline mass. The crude product was completely soluble in water. Analysis by electrometric titration in nonaqueous medium gave an equivalent weight of 275 (calculated 264). Titration in water showed that only a negligible amount of unreacted sulfamic acid was present in the crude product identified above.

Example 10

$$H_4NO_3SOCH_2CH_2SO_2(CH_2)_4SO_2CH_2CH_2OSO_3NH_4$$

Ammonium salt of 1,4-bis(beta-sulfatoethylsulfonyl)butane 97 grams (0.3 mol) of 1,4-bis(beta-hydroxyethylsulfonyl)butane of 94% purity, 61 grams (0.63 mol) of sulfamic acid, 10 grams of urea and 33 grams of dimethyl formamide were melted together at 70–75° C. The mixture was heated with mechanical stirring to 130°, and then maintained at 130°–140° for 1 hour. At the end of this time, the mixture was cooled and it set to a pasty mass which was completely soluble in water. Titration in water showed that 97% of the sulfamic acid used had been consumed. The crude product contained 16.5% dimethyl formamide, and 70% of the desired ammonium salt. Electrometric titration in non-aqueous medium gave an equivalent weight of 262 for the product (calculated 234).

Example 11

$$H_4NO_3SOCH_2CH_2SO_2CH_2CH_2OCH_2 CH_2SO_2CH_2CH_2OSO_3NH_4$$

Ammonium salt of di(beta-sulfatoethylsulfonyl ethyl) ether 72.5 grams (0.25 mol) of di(beta-hydroxyethylsulfonyl ethyl)ether, 51 grams (0.52 mol) of sulfamic acid and 7.2 grams of urea were reacted according to the procedure of Example 9. The crude product obtained in quantitative yield had an equivalent weight of 239 (calculated 242).

The conversion of the ammonium salts of Examples 9, 10 and 11 to alkali metal salts can be carried out by reaction with alkali metal carbonate or bicarbonate in aqueous solution. The use of alkali metal hydroxides for the conversion must be avoided, since the beta sulfatoethylsulfonyl compounds are dissociated in presence of strongly alkaline materials. Generally speaking, the solubility of the ammonium salts in water is higher than the solubility of the corresponding sodium and potassium salts, and the ammonium salts are therefore preferable for those uses where concentrated aqueous solutions are employed.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather that the claims be construed as encompassing all the features of patentable novelty which reside in the present invention including all features which would be treated as equivalents thereof by those skilled in the art to which the invention pertains.

What is claimed is:

[1. Compounds corresponding to the structure $$Q(SO_2CH_2CH_2Z)_y$$

where Q is an aliphatic radical having a molecular weight less than 250 and is a member selected from the group consisting of $—C_nH_{2n}—$ wherein n is greater than 2; and $—(C_nH_{2n}O)_mC_nH_{2n}—$ wherein n is greater than 1 and m is at least 1 and in which the number of unsatisfied valences is equal to y which has a value greater than one and Z is a polar residue derived from a reagent of weak nucleophilic character selected from the group consisting of the cation of a weak base having an ionization constant lower than $10^{-5}$ and the anion of a strong acid having an ionization constant greater than $10^{-5}$.]

2. $H_4NO_3SOCH_2CH_2SO_2(CH_2CH_2O)_2 CH_2CH_2SO_2CH_2CH_2OSO_3NH_4$.

3. $H_4NO_3SOCH_2CH_2SO_2(CH_2)_4SO_2 CH_2CH_2OSO_3NH_4$.

4. $NaO_3SSCH_2CH_2SO_2CH_2CH_2OCH_2CH_2 SO_2CH_2CH_2SSO_3Na$.

5. *Compounds corresponding to the structure*

$$Q(SO_2CH_2CH_2Z)_y$$

*where Q is an aliphatic radical having a molecular weight less than 250 and is a member selected from the group consisting of* $—C_nH_{2n}—$ *wherein n is greater than 2; and* $—(C_nH_{2n}O)_mC_nH_{2n}—$ *wherein n is greater than 1 and m is at least 1 and in which the number of unsatisfied valences is equal to y which has a value greater than one and Z is the anion of a strong acid having an ionization constant greater than* $10^{-5}$.

References Cited

The following references, cited by the Examiner, are of record in the patented file of this patent or the original patent.

UNITED STATES PATENTS

| | | | |
|---|---|---|---|
| 2,644,831 | 7/1953 | Kosmin | 260—458 |
| 2,645,659 | 7/1953 | Morris et al. | 260—458 X |
| 2,647,913 | 8/1953 | Kosmin | 260—458 |
| 2,657,988 | 11/1953 | Fincke | 260—294.8 |
| 2,682,544 | 6/1954 | Archer | 260—294.8 |
| 2,909,554 | 10/1959 | Doerr | 260—458 |
| 2,925,362 | 2/1960 | Fettes | 260—453 |
| 2,927,926 | 3/1960 | Zima | 260—294.8 |
| 2,934,552 | 4/1960 | Gaertner | 260—453 |
| 2,934,553 | 4/1960 | Doerr | 260—453 |
| 3,153,077 | 10/1964 | Tesoro | 260—453 |

FOREIGN PATENTS

| | | |
|---|---|---|
| 887,505 | 8/1953 | Germany. |
| 932,488 | 9/1955 | Germany. |

CHARLES B. PARKER, Primary Examiner

S. T. LAWRENCE III, Assistant Examiner

U.S. Cl. X.R.

8—76, 115.5; 260—2, 283, 286, 289, 290, 294.8, 456, 458, 488, 567.6, 607, 609, 686, 929